Patented Apr. 17, 1923.

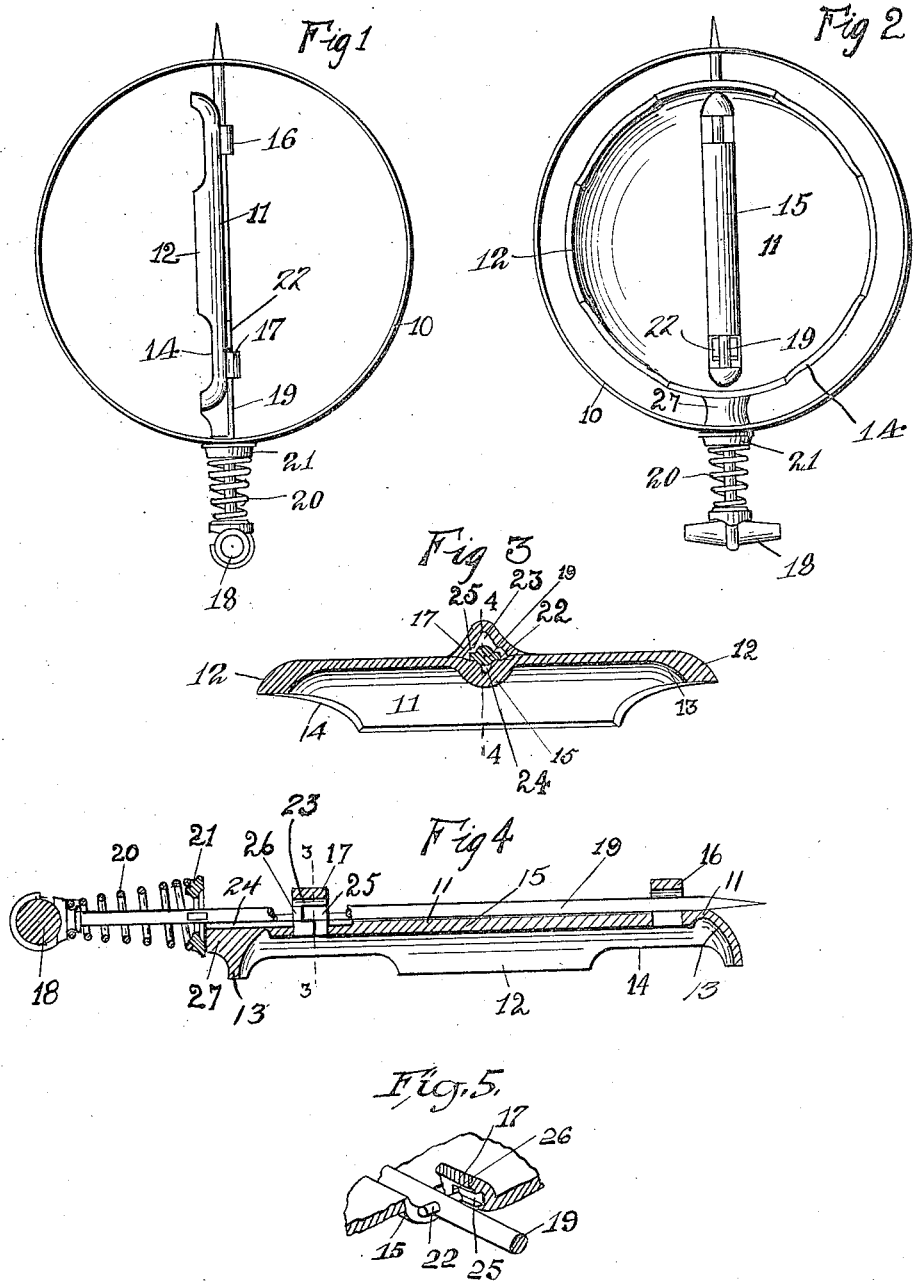
Apr. 17, 1923.   
J. W. KELLER ET AL   
DAMPER   
Filed Feb. 3, 1919   
1,451,985

1,451,985

UNITED STATES PATENT OFFICE.

JOHN W. KELLER AND REVILLO S. CONGAR, OF LORIMORE, IOWA.

DAMPER.

Application filed February 3, 1919. Serial No. 274,795.

*To all whom it may concern:*

Be it known that we, JOHN W. KELLER and REVILLO S. CONGAR, citizens of the United States, and residents of Lorimore, in the county of Union and State of Iowa, have invented a certain new and useful Damper, of which the following is a specification.

The object of our invention is to provide a damper of simple, durable and inexpensive construction.

More particularly it is our object to provide a damper which may be readily and easily installed in a pipe and consists of a solid disc-shaped member having at its periphery an annular flange, the flange being slightly curved on its surface adjacent to the direction from which the products of combustion come, said flange being provided with a series of notches.

A still further object is to provide in connection with said damper a spindle or the like, the spindle and damper having coacting means whereby they may be detachably connected together in the pipe.

With these and other objects in view our invention consists in the construction, arrangement and combination of the various parts of the device, whereby the objects contemplated are attained, as hereinafter more fully set forth pointed out in our claim and illustrated in the accompanying drawing, in which:

Figure 1 shows a top or plan view of a section of stove pipe equipped with a damper embodying our invention.

Figure 2 shows an inverted plan view of said section and the damper therein.

Figure 3 shows a central, sectional view through the damper taken on the line 3—3 of Figure 4; and Figure 4 shows a sectional view taken on the line 4—4 of Figure 3.

Figure 5 is a detailed view partly in section of a portion of our device, illustrating the method of locking.

In the accompanying drawing we have used the reference numeral 10 to indicate generally a section of stove pipe.

Our improved damper comprises a solid disc 11 having at its periphery an annular flange 12, said flange being curved at 13 on its surface adjacent to the combustion chamber, with which the damper is designed to be used. The flange 12 is provided with a plurality of notches 14.

It will be understood that in a vertical pipe section, when the damper is in horizontal position, as illustrated for instance in Figures 3 and 4, the flange 12 will be downturned, as shown in said figures.

For convenience the damper will be shown as installed in a vertical pipe section.

The damper is provided on its under surface with a rib 15 extending across it, and with spaced loops 16 and 17 above the damper.

The damper is designed to be used in connection with a handle 18, which is connected with a pivoted spindle 19.

On the spindle, adjacent to the handle, is a spring 20 and between the spring 20 and the damper is a collar 21. The spindle is provided with opposite lugs 22.

The grooved rib 15 and the loop 17 are provided with adjacent grooves 23 and 24 to receive the opposite lugs 22 on the spindle 19 and permit said lugs to pass through the loop 17 when the damper is installed on the spindle.

On the under surface at the sides of the loop 17 are grooves 25, illustrated in Figures 3 and 4, extending only part way through the loop, as shown.

The damper, with the spindle removed, is inserted in the pipe, and the spindle is then forced through the pipe or through holes provided for it, and is extended through the loops 17 and 16.

During the installation, the spindle is turned with relation to the loop 17, so that the lugs 22 pass through the grooves 23 and 24.

The spindle is forced inwardly until the spring 20 is compressed somewhat, whereupon the spindle is rotated until the lugs 22 are opposite the grooves 25, whereupon the spring 20 is allowed to expand, and the lugs 22 enter the grooves 25 until they engage the shoulders 26 at the outer ends of said grooves 25.

The lugs 22 will then engage the walls of the grooves 25, so that any rotation of the spindle 19 will tend to swing the damper.

The damper is preferably formed with a lug 27 on the part adjacent to the handle 18, and when the parts are installed there will be frictional engagement of the collar 21 and lug 27 with the wall of the pipe 10, so that the damper will be held in any tilted position in which it may be placed.

In the actual use of the damper, the damper is turned to its position shown in

Figure 1, which we may call its vertical position, when it is desired to have a strong draft. After the fire is going well, the damper is turned to position shown in Figures 2, 3 and 4 with the flange 12 down.

The heat and products of combustion will then pass upwardly to the damper, and thence around the edges thereof upwardly through the pipe.

It is well-known that the greatest heat is at the center of the upwardly moving column of air and products of combustion.

The hottest gases, therefore, pass upwardly against the damper, which has no openings in its center, and are deflected outwardly and laterally and thence downwardly by the flange 12. The hottest products of combustion then mingle with the smoke and heavier products of combustion at the outer portion of the upwardly moving column, and tend to cause a more complete combustion of the smoke and so forth, and burn up the soot and smoke.

It is desirable not to have the products of combustion pass upwardly through the center of the damper, as is done in many cases, for the reason that when a damper having a central opening is provided, the hottest gases and products of combustion pass directly upwardly through the hole in the damper and are to some extent wasted, whereas with our damper they are deflected outwardly, thereby causing a greater radiation of heat from the pipe 10 and are also mingled with the cooler and heavier products of combustion, with the result that the heavier products are burned with a more complete combustion and my damper thus serves to a considerable extent as a smoke consumer.

We have found that it is desirable to provide the notches 14 in the flange 12, for the reason that smoke is allowed to pass more freely upwardly through the pipe 16 and out through the notches.

The use of our damper causes much better utilization of the very hot gases by retarding them somewhat, while permitting the cooler and heavier products of combustion to pass upwardly around the edge of the damper, thereby utilizing the heat as much as possible and causing the hottest gases to consume the smoke and heavier products of combustion, and there is consequently a minimum of waste of heat.

Some changes may be made in the construction and arrangements of the parts of our improved damper without departing from the essential features and purposes of our invention, and it is our intention to cover by our claim any modified forms of structure, or use of mechanical equivalents which may be reasonably included within their scope.

We claim as our invention:

A damper for stove pipes, comprising a disc-shaped member having on one side a peripheral flange and having on the same side a smooth-faced rib, extending across the face of the disc, loops projecting from the opposite side of said damper, a spindle adapted to be received in said rib and said loops, the rib and one of said loops having oppositely disposed grooves, oppositely disposed lugs on the spindle adapted to be received in said grooves when the spindle is inserted in the damper, the said loop having a pair of oppositely disposed grooves arranged at right angles to the first grooves, said pair of grooves extending only part way through the loop, shoulders formed thereby in the inner ends of said pair of grooves, said pair of grooves being adapted to receive the lugs on the spindle, whereby said lugs will rest against said shoulders in said pair of grooves, and said spindle will be non-rotatably mounted in the damper, a boss formed on said damper at the point where the spindle enters the damper, said boss being adapted to rest against the inner surface of the stove pipe, a collar on said spindle, a handle on said spindle, and a spring received between said collar and said handle, said collar being adapted to rest against the outer surface of the stove pipe, said spring being adapted to hold said boss and said collar in frictional engagement with the stove pipe, whereby the damper may be held in any adjusted position, said flange being curved away from the disc 11, whereby when the damper is installed in the stove pipe, with the flange extending downwardly, the ascending gases may be given a downwardly whirling motion, said flange having notches terminating short of the body of said disc, whereby the gases may pass upwardly around the edges of the damper.

JOHN W. KELLER.
REVILLO S. CONGAR.